United States Patent
Kim (10) Patent No.: US 12,510,658 B2
(45) Date of Patent: Dec. 30, 2025

(54) OBSTACLE DETECTION SYSTEM AND METHOD USING DISTANCE SENSOR

(71) Applicant: HYUNDAI MOBIS CO., LTD., Seoul (KR)

(72) Inventor: Tae Sik Kim, Yongin-si (KR)

(73) Assignee: HYUNDAI MOBIS CO., LTD., Seoul (KR)

(\*) Notice: Subject to any disclaimer, the term of this patent is extended or adjusted under 35 U.S.C. 154(b) by 281 days.

(21) Appl. No.: 17/350,843

(22) Filed: Jun. 17, 2021

(65) Prior Publication Data
US 2021/0405186 A1    Dec. 30, 2021

(30) Foreign Application Priority Data
Jun. 25, 2020   (KR) .................. 10-2020-0077589

(51) Int. Cl.
*G01S 13/931*   (2020.01)
*G01S 15/931*   (2020.01)

(52) U.S. Cl.
CPC .......... *G01S 13/931* (2013.01); *G01S 15/931* (2013.01); *G01S 2013/93185* (2020.01)

(58) Field of Classification Search
None
See application file for complete search history.

(56) References Cited

U.S. PATENT DOCUMENTS

| | | | |
|---|---|---|---|
| 6,894,608 B1 * | 5/2005 | Gunderson | B60Q 1/525 340/471 |
| 2015/0234045 A1 * | 8/2015 | Rosenblum | G01S 13/931 342/70 |

(Continued)

FOREIGN PATENT DOCUMENTS

| | | |
|---|---|---|
| JP | 2005-505074 A | 2/2005 |
| KR | 101500162 B1 | 3/2015 |

(Continued)

OTHER PUBLICATIONS

Notice of Allowance issued on Jul. 22, 2025 in corresponding Korean patent application No. 10-2020-0077589.

*Primary Examiner* — Marcus E Windrich
(74) *Attorney, Agent, or Firm* — NovoTechIP International PLLC (57) ABSTRACT

There is provided an obstacle detection system using distance sensors including a first distance sensor which is mounted in a vehicle and senses a distance to the obstacle positioned inside a first field of view; a second distance sensor which is mounted in the vehicle to be spaced apart from the first distance sensor in the lateral direction of the vehicle and senses the distance to the obstacle positioned in a second field of view overlapping with the first field of view partially; an auxiliary sensor which is mounted in the vehicle between the first distance sensor and the second distance in the lateral direction of the vehicle and senses presence or absence of, or the distance to, the obstacle at least partially positioned with an overlapping field where the first field of view and the second field of view overlap with each other; and a detection unit detecting the obstacle based on the distances to the obstacle respectively sensed by the first distance sensor and the second distance sensor and the presence or absence, or the distance to the obstacle sensed by the auxiliary sensor.

9 Claims, 6 Drawing Sheets

(56) References Cited

U.S. PATENT DOCUMENTS

| | | | | |
|---|---|---|---|---|
| 2018/0024562 A1* | 1/2018 | Bellaiche | ................ | B60R 1/025 |
| | | | | 701/26 |
| 2020/0001877 A1* | 1/2020 | Burca | .................... | G01C 21/28 |
| 2020/0064483 A1* | 2/2020 | Li | ......................... | G01S 13/867 |
| 2020/0108805 A1* | 4/2020 | Woo | ....................... | G01S 13/867 |
| 2020/0174113 A1* | 6/2020 | Lee | ......................... | B60R 11/04 |
| 2020/0192403 A1* | 6/2020 | Silver | ................... | G01S 13/862 |
| 2020/0271755 A1* | 8/2020 | Wodrich | ............... | G01S 7/4008 |
| 2021/0264781 A1* | 8/2021 | Jang | ........................ | G06F 18/25 |
| 2023/0100164 A1* | 3/2023 | Sun | ...................... | B62D 5/0484 |
| | | | | 701/41 |

FOREIGN PATENT DOCUMENTS

| | | |
|---|---|---|
| KR | 10-2016-0013736 A | 2/2016 |
| KR | 10-2019-0052212 A | 5/2019 |
| KR | 10-2020-0067506 A | 6/2020 |

\* cited by examiner

OBSTACLE DETECTION SYSTEM AND METHOD USING DISTANCE SENSOR

CROSS REFERENCE TO RELATED APPLICATION

The present application claims priority to Korean Patent Application No. 10-2020-0077589, filed Jun. 25, 2020, the entire contents of which is incorporated herein for all purposes by this reference.

BACKGROUND OF THE INVENTION

Field of the Invention

The present invention relates to obstacle detection system and method using distance sensors, and more particularly, to technique of detecting a position of an obstacle using distance sensors sensing a distance to the obstacle only.

Description of the Related Art

Various distance sensors such as an ultrasonic sensor, a radar sensor, and the like are installed in vehicles to avoid a collision with an obstacle such as another vehicle or a pedestrian, and in particular, the sensors are positioned at the rear of the vehicle to detect an obstacle that may collide with the vehicle moving backward.

A radar sensor may determine a position of an obstacle by simultaneously calculating an azimuth and a distance to the obstacle using an array of a plurality of antennas and frequency modulated continuous waves (FMCWs) and may be mainly used as a long range viewing sensor when the vehicle travels due to the difference in performance such as sensing distance, transmission and reception speed, and the like.

However, an ultrasonic sensor calculates the distance to the obstacle by measuring the time of flight of a transmitted ultrasonic wave reflected from the obstacle while a single antenna radar sensor (ultra short range radar (USRR)) measures the distance to the obstacle by measuring the time of flight of a transmitted electromagnetic wave reflected from the obstacle, and a single sensor only senses the distance to the obstacle without sensing azimuth.

Accordingly, the ultrasonic sensor and single antenna radar sensor were mainly used as auxiliary parking sensors in accordance with the distance to the obstacles, but a plurality of ultrasonic sensors are used to determine the position of the obstacle by a trigonometric method and, through this, applied to the rear autonomous emergency braking (R-AEB).

Figure 1:
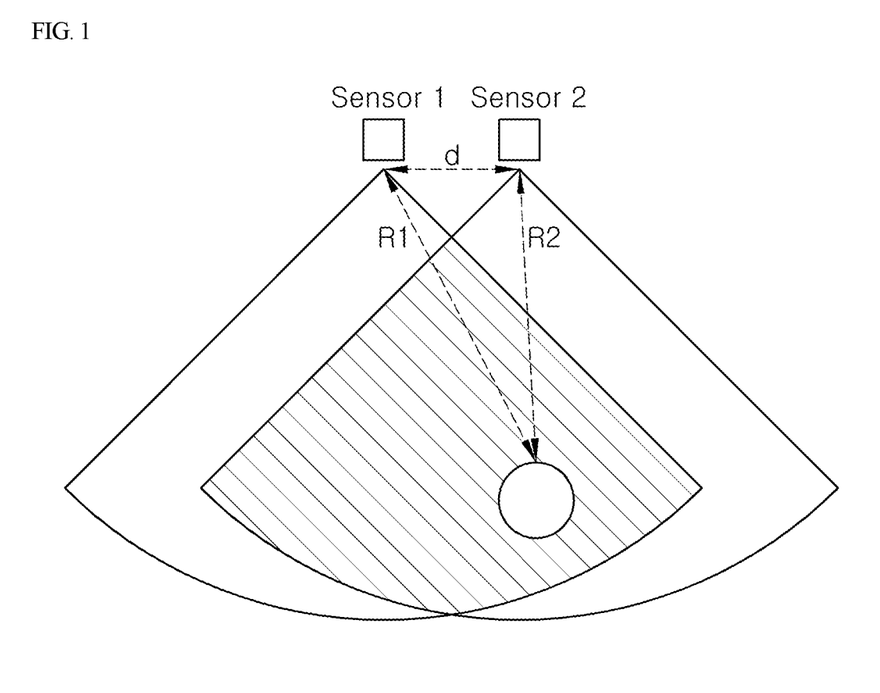
FIGS. 1 and 2 show a trigonometric method of a distance sensor according to the conventional art.
Figure 2:
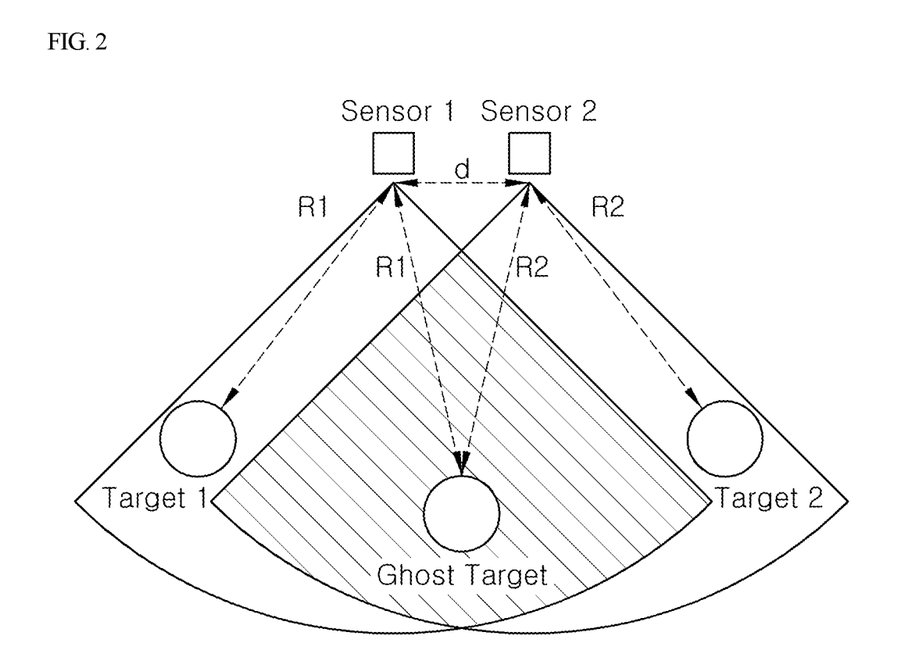

FIGS. 1 and 2 are diagrams showing a trigonometric method of a distance sensor in the related art.

FIGS. 1 and 2 further show that an obstacle may be sensed by a trigonometric method by deploying a plurality of ultrasonic sensors or single antenna radar sensors, a single sensor of which only senses the distance to the obstacle without sensing an azimuth.

In particular, as shown in FIG. 1, when an obstacle is positioned in a field where the fields of view of a plurality of sensors, sensors 1 and 2, are deployed to be spaced apart from each other, the position of the obstacle may be sensed by the trigonometric method using the distances R1 and R2 to the obstacles sensed by respective sensors.

However, as shown in FIG. 2, when obstacles, Targets 1 and 2, different from each other, are positioned outside the field where the fields of view overlap with each other and are sensed by the respective sensors, Sensors 1 and 2, there is a problem that the obstacles are detected at the Ghost Target other than the actual positions.

In particular, when a vehicle enters a parking space where parked vehicles exist on both sides, there is a problem that obstacles are detected at the Ghost Target other than the actual positions by the trigonometric method, which leads to a problem of malfunctioning in the rear emergency braking.

The matters described above as the technical background are intended only for better understanding of the background of the present invention and should not be taken as an acknowledgement that they correspond to the conventional art already known to those with common knowledge in the related art.

SUMMARY OF THE INVENTION

The present invention is proposed to solve such a problem and aims to provide an obstacle detection system and method for accurately sensing the position of the obstacle using distance sensors to a minimum.

An obstacle detection system using distance sensors according to the present invention includes a first distance sensor that is installed in a vehicle and senses a distance to an obstacle positioned within a first field of view; a second distance sensor that is installed in the vehicle to be spaced apart from the first distance sensor in a lateral direction of the vehicle, and senses a distance to an obstacle positioned within a second field of view partially overlapping with the first field of view; an auxiliary sensor that is installed in the vehicle between the first distance sensor and the second distance sensor in the lateral direction of the vehicle and senses presence or absence of, or a distance to, an obstacle at least partially positioned within an overlapping field where the first field of view and the second field of view overlap with each other; and a detection unit detecting an obstacle based on the distances to the obstacle respectively sensed by the first distance sensor and the second distance sensor and the presence or absence of, or the distance to, the obstacle sensed by the auxiliary sensor.

The first distance sensor and the second distance sensor may be ultrasonic sensors or radar sensors having a single antenna sensing a spacing distance to an obstacle.

The field of view of the auxiliary sensor may be formed narrower than the first field of view or the second field of view.

The field of view of the auxiliary sensor may be limited within a lateral range corresponding to a width of a vehicle or an high collision range in a traveling direction of a vehicle.

The auxiliary sensor may sense the distance to the obstacle at least partially positioned within the overlapping field and the detection unit may estimate the position of the obstacle using the distances to the obstacle sensed by the first distance sensor and the auxiliary sensor, estimate the position of the obstacle sensed by the second distance sensor and the auxiliary sensor, and detect the obstacle based on the positions of the obstacle estimated respectively.

When the position of the obstacle estimated using the distances to the obstacle sensed by the first distance sensor and the auxiliary sensor and the position of the obstacle estimated using a difference between the distances to the obstacle sensed by the second distance sensor and the auxiliary sensor is within a predetermined range, the detection unit may detect the obstacle positioned within the overlapping field.

The auxiliary sensor may sense the presence or absence of the obstacle at least partially positioned within the overlapping field, and the detection unit may estimate the position of the obstacle based on the distances to the obstacle sensed by the first distance sensor and the second distance sensor but may detect the obstacle positioned outside the overlapping field when the auxiliary sensor senses no obstacle.

The auxiliary sensor may include a plurality of viewing sensors which are deployed to be spaced apart from each other in the lateral direction of the vehicle and of which the respective fields of view partially overlap with each other.

In the auxiliary sensor, a first transmission unit and a second transmission unit transmitting ultrasonic or electromagnetic waves may be deployed to be spaced apart from each other in the lateral direction of the vehicle, a first reception unit and a second reception unit receiving the ultrasonic or electromagnetic waves respectively transmitted from the first transmission unit and the second transmission unit may be deployed to be spaced apart from each other in the lateral direction, and the first transmission unit and the second reception unit may be positioned on one side with respect to the lateral center of the vehicle while the second transmission unit and the first reception unit may be positioned on the other side with respect to the lateral center of the vehicle.

An obstacle detection method using distance sensors for achieving the object mentioned above includes a sensing step where the first distance sensor and the second distance sensor spaced apart from each in the lateral direction of a vehicle sense a distance to an obstacle positioned within each of a first field of view and a second field of view overlapping with the first field of view; a sensing step where the auxiliary sensor positioned between the first distance sensor and the second distance sensor in the lateral direction of the vehicle senses the presence or absence of, or a distance to, an obstacle at least partially positioned within an overlapping field where the first field of view and the second field of view overlap with each other, and a detection step where the obstacle is detected based on the distances to the obstacle respectively sensed by the first distance sensor and second distance sensor and presence or absence of, or the distance to, the obstacle sensed by the auxiliary sensor.

In the step where the auxiliary sensor senses the presence or absence of, or the distance to, the obstacle, the distance to the obstacle at least partially positioned within the overlapping field may be sensed, and, in the step where the obstacle is detected, the position of the obstacle may be estimated using the distances to the obstacle sensed by the first distance sensor and auxiliary sensor, the position of the obstacle sensed by the second distance sensor and auxiliary sensor may be estimated, and the position of the obstacle may be detected based on the positions of the obstacle estimated respectively.

In the step where the obstacle is detected, when a difference between the position of the obstacle estimated using the distances to the obstacle sensed by the first distance sensor and auxiliary sensor and the position of the obstacle estimated using the distances to the obstacle sensed by the second distance sensor and auxiliary sensor is within a predetermined range, the obstacle may be detected within the overlapping field may be detected.

In the step where the auxiliary sensor senses the presence or absence of, or the distance to, the obstacle, the presence or absence of the obstacle at least partially positioned within the overlapping field may be sensed, and, in the step where the obstacle is detected, the position of the obstacle may be estimated based on the distances to the obstacle sensed by the first distance sensor and second distance sensor, but when the auxiliary sensor senses no obstacle, the obstacle may be detected outside the overlapping field.

In the step where the auxiliary sensor senses the presence or absence, or the distance to, the obstacle, the presence or absence of the obstacle at least partially positioned within the overlapping field may be sensed, and, in the step where the obstacle is detected, the position of the obstacle may be estimated based on the distances to the obstacle sensed by the first distance sensor and second distance sensor, but when the auxiliary sensor senses the presence of the obstacle, the obstacle may be detected within the overlapping field.

According to the obstacle detection system and method using distance sensors of the present invention, there is the effect of improving the accuracy in detecting a position of an obstacle for a vehicle.

Also, there is an effect of cost cur by detecting the obstacle while using low-cost distance sensors to a minimum.

DETAILED DESCRIPTION OF THE INVENTION

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments according to the present invention may be modified in various ways and have various forms, specific embodiments will be illustrated in the drawings and described in detail in the present specification or application. However, this is not intended to limit the embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present invention. Singular expressions include plural expressions unless the context clearly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present invention belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present invention will be described in detail by describing preferred embodiments of the present invention with reference to the accompanying drawings. The same reference numerals shown in each drawing indicate the same members.

Figure 3:
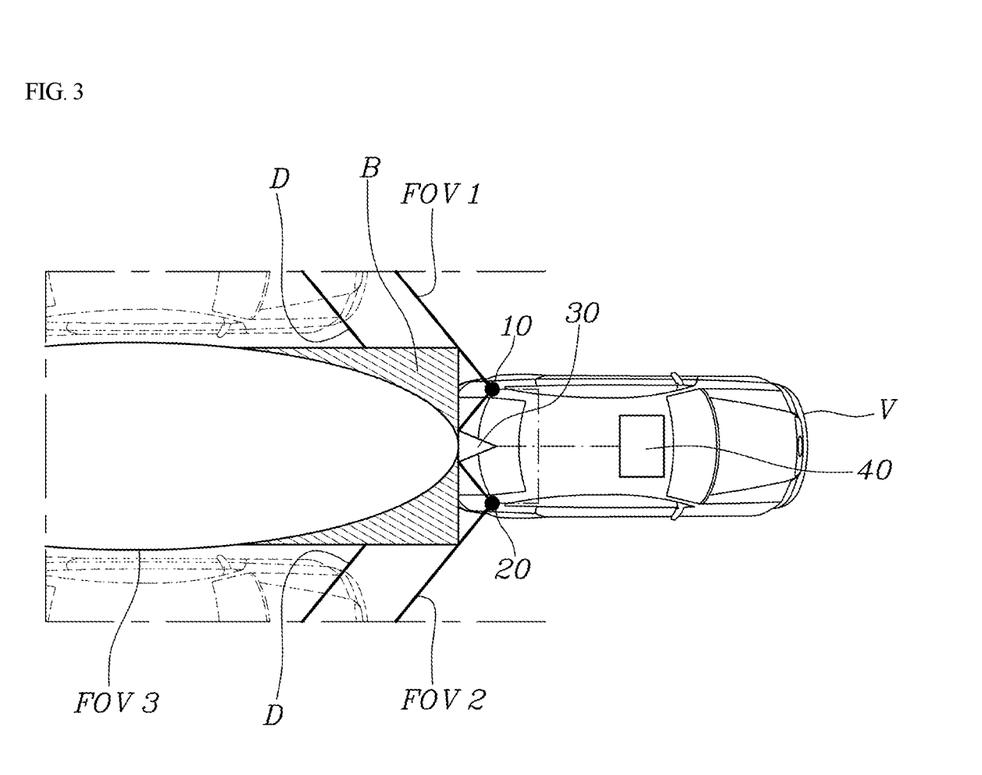
FIG. 3 is a block diagram showing an obstacle detection system using distance sensors according to an embodiment of the present invention.

FIG. 3 is a block diagram showing an obstacle detection system using distance sensors according to an embodiment of the present invention.

FIG. 3 shows that an obstacle detection system using distance sensors according to an embodiment of the present invention includes a first distance sensor 10 that is installed in the vehicle and senses a distance to the obstacle positioned within a first field of view (FOV1); a second distance sensor 20 that is installed in the vehicle to be distanced apart from the first distance sensor 10 in the lateral direction of the vehicle and senses the distance to the obstacle positioned within the second field of view (FOV2) partially overlapping with the first field of view (FOV1); an auxiliary sensor 30 that is installed in the vehicle between the first distance sensor 10 and the second distance sensor 20 in the lateral direction of the vehicle and senses the presence or absence of, or the distance to, the obstacle at least partially positioned within an overlapping field where the first field of view (FOV1) and the second field of view (FOV2) overlap with each other; and a detection unit 40 detecting the obstacle based on the distances to the obstacle sensed by the first distance sensor 10 and the second distance sensor 20 and the presence or absence of, or distance to, the obstacle sensed by the auxiliary sensor 30.

The first distance sensor 10 and second distance sensor 20 may be deployed to be spaced apart from each other in the lateral direction of the vehicle. The first distance sensor 10 and second distance sensor 20 may be spaced apart from each other so as to be respectively deployed at right and left end portions of the vehicle.

In addition, the first distance sensor 10 and second distance sensor 20 are described as being deployed at the rear end portion of the vehicle to sense the rear of the vehicle, but may be deployed at the front end portion of the vehicle to be applied to sensing the front of the vehicle.

The first distance sensor 10 and second distance sensor 20 may sense the distances to obstacles respectively positioned in the first field of view (FOV1) and the second field of view (FOV2). The first field of view (FOV1) and the second field of view (FOV2) may extend to the range beyond the width of the vehicle at the front or rear of the vehicle. That is, the first field of view (FOV1) and the second field of view (FOV2) may respectively include the left side field and the right side field at the front or rear of the vehicle.

In particular, the first field of view (FOV1) and the second field of view (FOV2) may partially overlap with each other and the field where the first field of view (FOV1) and the second field of view (FOV2) overlap with each other may be defined as an overlapping field D. The overlapping field D may be positioned in the rear of the vehicle, inclusive of the lateral center.

The auxiliary sensor 30 is positioned between the first distance sensor 10 and the second distance sensor 20 in the lateral direction, and, in particular, may be deployed at the lateral center of the vehicle. The auxiliary sensor 30 may be positioned at the front end portion or the rear end portion with respect to the lateral center of the vehicle, and, when positioned at the rear end portion, may be positioned in the rear of the first distance sensor 10 and the second distance sensor 20.

The field of view FOV3 of the auxiliary sensor 30 may include a part of the overlapping field D. In particular, the auxiliary sensor 30 may sense the presence or absence of the obstacle positioned in a part of the overlapping field D or sense the distance to the obstacle positioned in a part of the overlapping field D.

The detection unit 40 may detect the position of the obstacle using the distances to the obstacle respectively sensed by the first distance sensor 10 and the second distance sensor 20 and detect the presence or absence of an obstacle that may collide with the vehicle depending on the traveling direction of the vehicle, but the presence or absence of, or the distance to, the obstacle sensed by the auxiliary sensor 30 may be considered.

In an embodiment, when the auxiliary sensor 30 detects the obstacle positioned in the overlapping field D or in the rear of the vehicle based on the distances to the obstacle sensed by the first distance sensor 10 and the second distance sensor 20, the detection unit 40 may examine whether the obstacle is actually positioned in the overlapping field D or in the rear of the vehicle based on the presence or absence of the obstacle detected by the auxiliary sensor 30.

In another embodiment, the detection unit 40 may detect the position of an obstacle using all the distances to the obstacle sensed by the first distance sensor 10, second distance sensor 20, and auxiliary sensor 30.

In addition, a control unit (not shown) may be further included that warns a driver of the position of the obstacle or controls the vehicle to decelerate based on the obstacle detected by the detection unit 40. The control unit may warn of the sensing of the obstacle on a display cluster of the vehicle or control the vehicle to generate a waning alarm and may control the brake system of the vehicle to emergency brake the vehicle (AEB or R-AEB).

A detection unit 40 and a control unit (not shown) according to an exemplary embodiment of the present invention may be implemented through a processor (not shown) configured to perform operations to be described below using an algorithm configured to control the operations of various components of a vehicle or a nonvolatile memory (not shown) configured to store data relating to software commands for reproducing the algorithm and the data stored in the memory. Here, the memory and the processor may be implemented as individual chips. Alternatively, the memory and processor may be implemented as an integrated single chip. The processor may take the form of one or more processors. Here, the memory and the processor may be implemented as individual chips. Alternatively, the memory and processor may be implemented as an integrated single chip. The processor may take the form of one or more processors.

The first distance sensor 10 and the second distance sensor 20 may be distance sensors featuring an ultrasonic sensor sensing the separating distance to an obstacle or a radar sensor having a single antenna.

Specifically, the first distance sensor 10 and the second distance sensor 20 may be distance sensors that transmit ultrasonic or electromagnetic waves and receive the ultrasonic or electromagnetic waves reflected from the obstacle after hitting the obstacle to calculate the distance to the obstacle by measuring the time of flight (TOF) taken in reflection and return from the obstacle.

The first distance sensor 10 and the second distance sensor 20 may be radar sensors simultaneously sensing the distance and azimuth to the obstacle with an array of a plurality of antennas or may be radar sensors only sensing the distance to the obstacle with a single antenna.

In addition, the auxiliary sensor 30 may be an ultrasonic sensor sensing the separating distance to the obstacle or a radar sensor with a single antenna.

In still another embodiment, the auxiliary sensor 30 may be a sensor that only determines the presence or absence of the obstacle within a field of view (FOV3) including a part of the overlapping field D. For example, various sensors such as a camera sensor, an infrared sensor, and the like are applicable.

Specifically, the field of view (FOV3) of the auxiliary sensor 30 may be formed narrower than the first field of view (FOV1) and the second field of view (FOV2).

The first distance sensor 10 and the second distance sensor 20 may be sensors having a wide horizontal field of view (FOV) so that the first field of view (FOV1) and the second field of view (FOV2) may include not only the rear but rear side of the vehicle.

In contrast, the auxiliary sensor 30 may be a sensor having a relatively narrow horizontal field of view. The field of view of the auxiliary sensor 30 may be narrowly limited such that the field of view (FOV3) includes only a part of the overlapping field D where the first field of view (FOV1) and the second field of view (FOV2) overlap with each other.

In an embodiment, a component such as a waveguide that limits the angular scope for transmitting or receiving the electromagnetic waves may be further included within the auxiliary sensor 30, which consequently limits the horizontal field of view.

In particular, the field of view (FOV3) of the auxiliary sensor 30 may be limited within a lateral range corresponding to the width of the vehicle or a high collision range in the traveling direction of the vehicle.

In an embodiment, the field of view (FOV3) of the auxiliary sensor 30 may be a lateral range corresponding to the width of the vehicle. In another embodiment, the field of view (FOV3) of the auxiliary sensor 30 may be limited to or within the high collision range in the traveling direction of the vehicle.

The high collision range may be a range where a collision is likely as the vehicle continues to proceed, depending on the steering of the vehicle and the lateral range of the vehicle.

In an embodiment, the auxiliary sensor 30 may sense the distance to the obstacle at least partially positioned within the overlapping field D and the detection unit 40 may estimate the position of the obstacle using the distances to the obstacle sensed by the first distance sensor 10 and the auxiliary sensor 30, estimate the position of the obstacle sensed by the second distance sensor 20 and the auxiliary sensor 30, and detect the obstacle based on the positions of the obstacle estimated respectively.

The detection unit 40 may estimate the position of the obstacle by applying a trigonometric method on the distance to the obstacle sensed by the first distance sensor 10 and the distance to the obstacle sensed by the auxiliary sensor 30. Specifically, the detection unit 40 may estimate that the point where an arc having a constant distance from the first distance sensor 10 within the first field of view (FOV1) and an arc having a constant distance from the auxiliary sensor 30 within the field of view (FOV3) of the auxiliary sensor 30 overlap with each other is the position of the obstacle.

In addition, the detection unit 40 may estimate the position of the obstacle using a trigonometric method on the distance to the obstacle sensed by the second distance sensor 20 and the distance to the obstacle sensed by the auxiliary sensor 30.

The detection unit 40 may detect the obstacle based on the positions of the obstacle estimated by the first distance sensor 10 and the auxiliary sensor 30 and the positions of the obstacle estimated by the second distance sensor 20 and the auxiliary sensor 30.

More specifically, when a difference between the position of the obstacle estimated using the distances to the obstacle sensed by the first distance sensor 10 and the auxiliary sensor 30 and the position of the obstacle estimated using the distances to the obstacle sensed by the second distance sensor 20 and the auxiliary sensor 30 is within a predetermined range, the detection unit 40 may detect the obstacle positioned within the overlapping field D.

The predetermined range may be a margin of error experimentally set in consideration of noises occurring in the actual driving environment of the vehicle. The predetermined range may be set at a linear distance between respective obstacles or between X-axis and Y-axis coordinates of the obstacle.

When the estimated positions of the obstacle are within the predetermined range, the detection unit 40 may detect the obstacle positioned within the overlapping field D.

On the contrary, when the difference between the positions of the obstacle estimated respectively is not within the predetermined range, the detection unit 40 may determine that the obstacle is outside the overlapping field D. In addition, the detection unit 40 may determine that the obstacles estimated respectively are obstacles different from each other positioned outside the overlapping field D.

In another embodiment, the auxiliary sensor 30 may sense the presence or absence of the obstacle at least partially positioned within the overlapping field D, and the detection unit 40 may estimate the position of the obstacle based on the distances to the obstacle sensed by the first distance sensor 10 and the second distance sensor 20, but when the auxiliary sensor 30 senses no obstacle, the obstacle may be detected outside the overlapping field D may be detected.

The auxiliary sensor 30 may sense the presence or absence of the obstacle within the field of view (FOV3) including a part of the overlapping field D.

The detection unit 40 may estimate the position of the obstacle by a trigonometric method using the distances to the obstacle sensed by the first distance sensor 10 and second distance sensor 20. In addition, when the estimated position of the obstacle is within the overlapping field D, the detection unit 40 may detect the obstacle using the presence or absence of the obstacle within the field of view (FOV3) sensed by the auxiliary sensor 30.

In an embodiment, when the estimated position of the obstacle is within the overlapping field D while the auxiliary sensor 30 senses the obstacle existing within the field of view (FOV3), the detection unit 40 may detect the obstacle positioned within the overlapping field D.

On the contrary, when the estimated position of the obstacle in within the overlapping field D while the auxiliary sensor 30 senses no obstacle within the field of view (FOV3), the detection unit 40 may detect the obstacle positioned outside the overlapping field D.

In particular, the detection unit 40 may determine that the obstacles sensed by the first distance sensor 10 and the second distance sensor 20 are different obstacles and that the obstacle sensed in the overlapping field D may be detected at the Ghost Target other than the actual positions.

Figure 4:
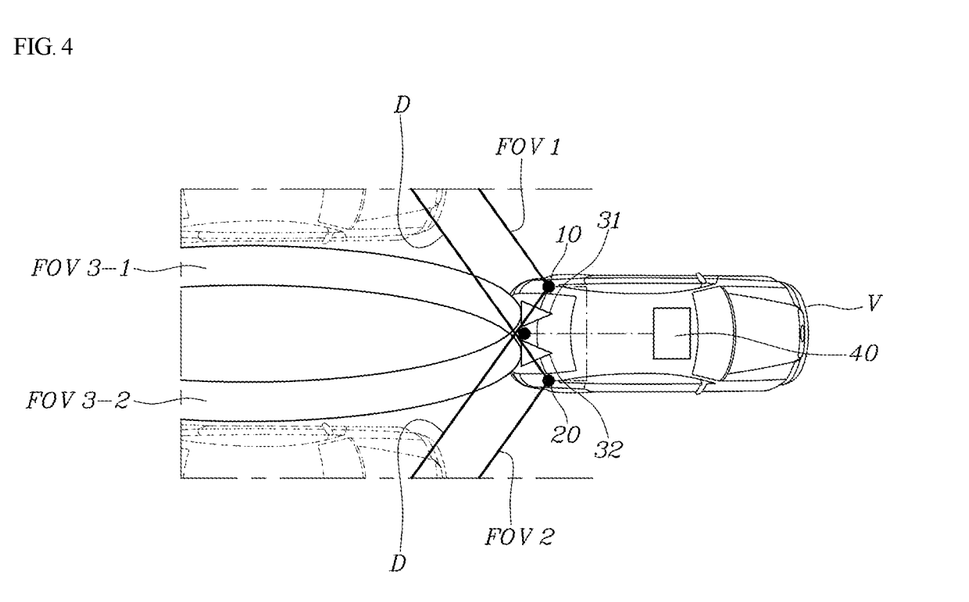
FIG. 4 is a block diagram showing an obstacle detection system using distance sensors according to another embodiment of the present invention.

FIG. 4 is a block diagram showing an obstacle detection system using distance sensors according to another embodiment of the present invention.

FIG. 4 shows that the auxiliary sensor 30 may include a plurality of sensors which are deployed to be spaced apart from each other in the lateral direction of the vehicle and of which the respective fields of view (FOV3) partially overlap with each other.

The field of view (FOV3) of the auxiliary sensor 30 is generally formed in a radial shape with the transmission unit and the reception unit as the origins, and accordingly, a blind field B may occur around the auxiliary sensor 30. The auxiliary sensor 30 may not normally view the obstacle positioned in the blind field B.

In order to minimize such blind field B, a plurality of viewing sensors 31 and 32 may be deployed at positions spaced apart from each other in the lateral direction of the vehicle.

In an embodiment, a first viewing sensor 31 and a second viewing sensor 32 may be deployed between the first distance sensor 10 and second distance sensor 20 in the lateral direction of the vehicle. The first viewing sensor 31 and second viewing sensor 32 may be deployed at the center of the vehicles to be spaced apart from each other in the lateral direction.

A field of view (FOV3-1) of the first viewing sensor 31 and a field of view (FOV3-2) of the second viewing sensor 32 may partially overlap with each other. The field of view (FOV3-1) of the first viewing sensor 31 and the field of view (FOV3-2) of the second viewing sensor 32 may overlap with each other to include a lateral center line of the vehicle.

In particular, the field of view (FOV3-1) of the first viewing sensor 31 and the field of view (FOV3-2) of the second viewing sensor 32 may be limited to the lateral range corresponding to the width of the vehicle or within the high collision range in the traveling direction of the vehicle.

Figure 5:
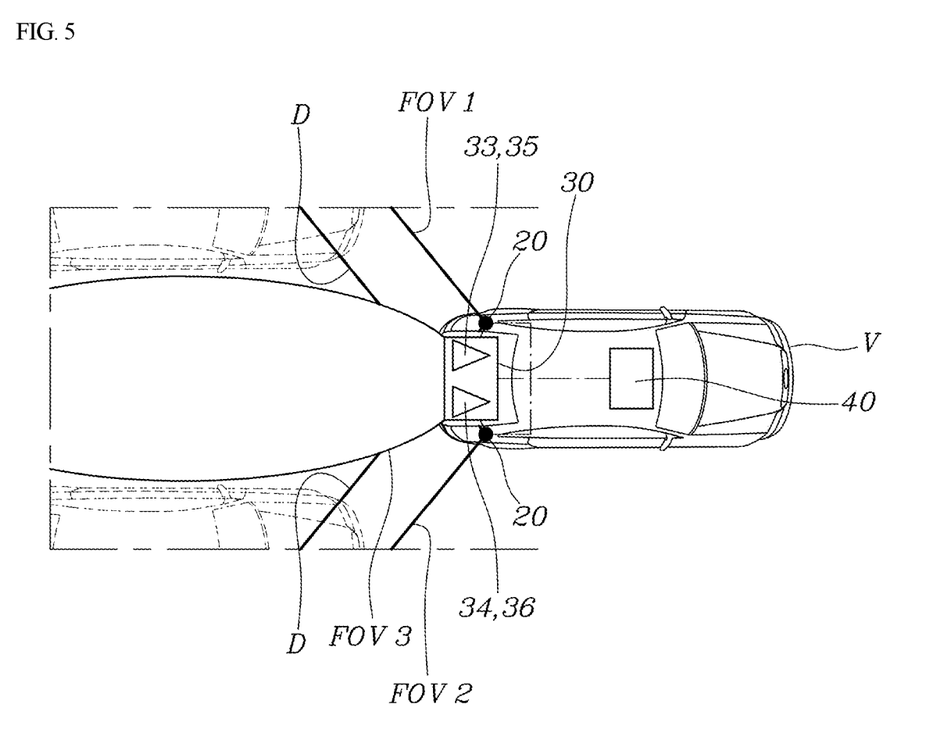
FIG. 5 is a block diagram showing an obstacle detection system using distance sensors according to still another embodiment of the present invention.

FIG. 5 is a block diagram showing an obstacle detection system using distance sensors according to still another embodiment of the present invention.

FIG. 5 shows that, in the auxiliary sensor 30, a first transmission unit 33 and a second transmission unit 34 transmitting the ultrasonic or electromagnetic waves may be deployed to be spaced apart from each other in the lateral direction of the vehicle and a first reception unit 35 and a second reception unit 36 receiving the ultrasonic or electromagnetic waves transmitted from the first transmission unit 33 and the second transmission unit 34 may be deployed to be spaced apart from each other in the lateral direction of the vehicle, while the first transmission unit 33 and the second reception unit 36 may be positioned on one side with respect to the lateral center of the vehicle and the second transmission unit 34 and the first reception unit 35 may be positioned on the other side with respect to the lateral center of the vehicle.

In other words, the ultrasonic or electromagnetic waves transmitted from the first transmission unit 33 may be received by the first reception unit 35, and the ultrasonic or electromagnetic waves transmitted from the second transmission unit 34 may be received by the second reception unit 36.

The first transmission unit 33 and the first reception unit 35 may be positioned at the opposite sides with respect to the lateral center line of the vehicle, while the second transmission unit 34 and the second reception unit 36 may also be positions at the opposite sides with respect to the lateral center line of the vehicle.

For example, the ultrasonic or electromagnetic waves transmitted from the first transmission unit 33 positioned on the left side of the vehicle may be received by the first reception unit 35 positioned on the right side of the vehicle, while the ultrasonic or electromagnetic waves transmitted from the second transmission unit 34 positioned on the right side of the vehicle may be received by the second reception unit 36 positioned on the left side of the vehicle.

In an embodiment, the first transmission unit 33, the first reception unit 35, the second transmission unit 34, and second reception unit 36 may be integrally combined into a single sensor module to be connected to a single PCB.

Figure 6:
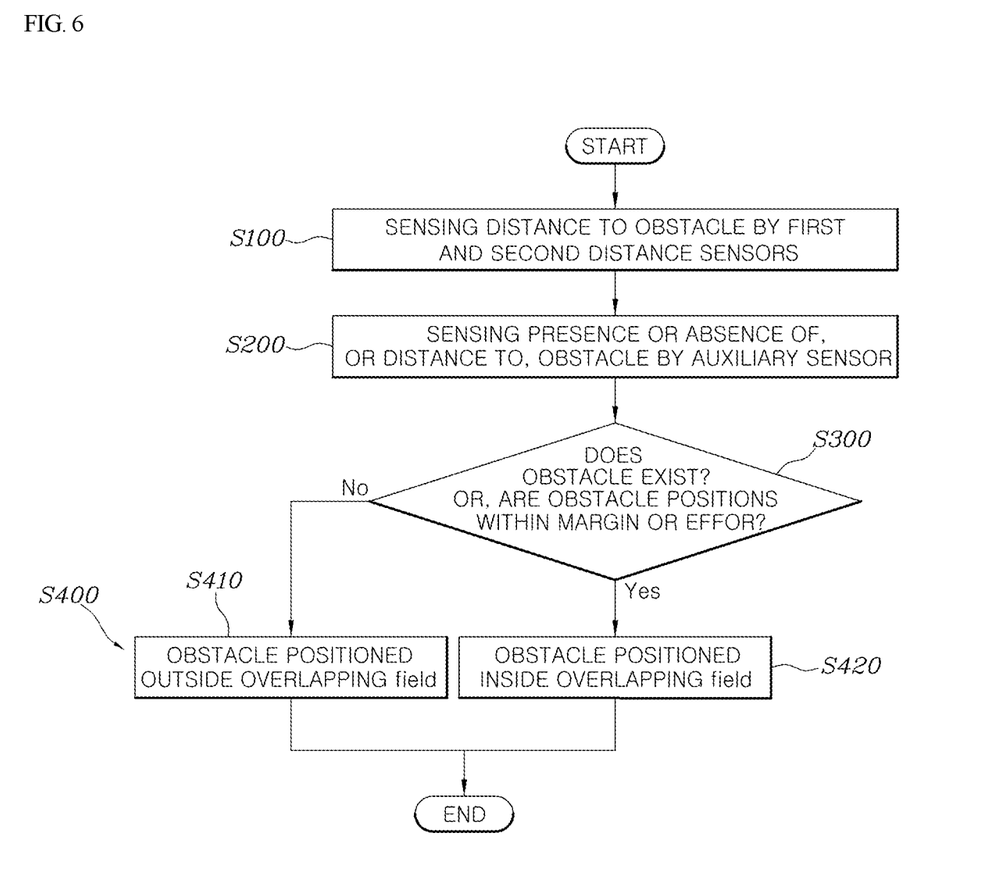
FIG. 6 is a flow chart showing an obstacle detection method using distance sensors according to an embodiment of the present invention.

FIG. 6 is a flow chart showing an obstacle detection method using distance sensors according to an embodiment of the present invention.

FIG. 6 shows that the obstacle detection method using distance sensors according to an embodiment of the present invention includes a sensing step S100 where the first distance sensor 10 and the second distance sensor 20 spaced apart from each in the lateral direction of the vehicle sense the distance to the obstacle positioned within each of the first field of view (FOV1) and the second field of view (FOV2) overlapping with the first field of view (FOV1); a sensing step S200 where the auxiliary sensor 30 positioned between the first distance sensor 10 and the second distance sensor 20 in the lateral direction of the vehicle senses the presence or absence of, or distance to, the obstacle at least partially positioned within the overlapping field D where the first field of view (FOV1) and the second field of view (FOV2) overlap with each other; and a detection step S400 where the obstacle is detected based on the distances to the obstacle sensed by the first distance sensor 10 and the second distance sensor 20 and the presence or absence of, or distance to, the obstacle sensed by the auxiliary sensor 30.

In an embodiment, in the sensing step S200 where the auxiliary sensor 30 may sense the presence or absence of, or distance to, the obstacle, the distance to the obstacle positioned entirely or partially within the overlapping field D is sensed; and in the sensing step S400 where the obstacle is detected, the position of the obstacle may be estimated using the distances to the obstacle sensed by the first distance sensor 10 and the auxiliary sensor 30, the position of the obstacle is estimated using the distances to the obstacle sensed by the second distance sensor 20 and the auxiliary sensor 30, and the obstacle may be detected based on the estimated positions of the obstacle estimated respectively.

In addition, the step S400 where the obstacle is detected, when a difference between the position of the obstacle estimated using the distances to the obstacle sensed by the first distance sensor 10 and the auxiliary sensor 30 and the position of the obstacle estimated using the distances to the obstacle sensed by the second distance sensor 20 and the auxiliary sensor 30 is within the predetermined range or margin of error (S300), the obstacle may be detected within the overlapping field D (S420).

In addition, in the step S400 where the obstacle is detected, when the difference between the position of the obstacle estimated using the distances to the obstacle sensed by the first distance sensor 10 and the auxiliary sensor 30 and the position of the obstacle estimated using the distances to the obstacle sensed by the second distance sensor 20 and the auxiliary sensor 30 is not within the predetermined range or margin of error (S300), the obstacle may be detected outside the overlapping field D (S420).

In the step S200 where the auxiliary sensor 30 senses the presence or absence of, or distance to, the obstacle, the presence or absence of the obstacle at least partially positioned within the overlapping field D may be sensed, in the step S400 where the obstacle is detected, the position of the obstacle may be estimated based on the distances to the obstacle sensed by the first distance sensor 10 and the second distance sensor 20, but when the auxiliary sensor 30 senses no obstacle, the obstacle may be positioned outside the overlapping field D (S410).

In another embodiment, in the step S200 where the auxiliary sensor 30 senses the presence or absence, or distance to, the obstacle, the presence or absence of the obstacle at least partially positioned within of the overlapping field D is sensed, and in the step S400 where the obstacle is detected, the position of the obstacle is sensed based on the distances to the obstacle sensed by the first distance sensor 10 and the second distance sensor 20, but when the auxiliary sensor 30 senses an presence of the obstacle, the obstacle may be detected within the overlapping field D.

Specific embodiments of the present invention is illustrated and described, but it will be self-evident to those with common knowledge in the related art that the present invention may be improved and modified in various ways within the scope not deviating from the technical spirit of the present invention provided by the patent claims below.

What is claimed is:

1. An obstacle detection system for a rear autonomous emergency braking (R-AEB) system, the obstacle detection system comprising:
   a first distance sensor installed in a vehicle and having a first field of view of a rear region behind a vehicle, the first distance sensor configured to sense a first distance to a first obstacle positioned within the first field of view as the vehicle moves rearwardly, the first obstacle being stationary;
   a second distance sensor installed in the vehicle, spaced apart from the first distance sensor in a lateral direction of the vehicle and having a second field of view of the rear region behind the vehicle that partially overlaps the first field of view to define an overlapping field of view, the second distance sensor configured to sense a second distance to a second obstacle positioned within the second field of view as the vehicle moves rearwardly, the second obstacle being stationary;
   an auxiliary sensor installed in the vehicle and positioned between the first and second distance sensors in the lateral direction of the vehicle, the auxiliary sensor having a third field of view that is within the overlapping field, the auxiliary sensor configured to sense a third distance to an obstacle at least partially positioned within the third field of view as the vehicle moves rearwardly; and
   a detection unit configured to determine whether the first obstacle and the second obstacle are a same obstacle positioned within the overlapping field of view or different obstacles positioned outside the overlapping field of view based on the first distance to the first obstacle, the second distance to the second obstacle, and the third distance to the obstacle in the third field of view,
   wherein the detection unit is further configured to:
      estimate a first position of the first obstacle using a trigonometric method based on the first distance and the third distance detected by the first sensor and the auxiliary distance sensor, respectively;
      estimate a second position of the second obstacle using the trigonometric method based on the second distance and the third distance detected by the second sensor and the auxiliary distance sensor, respectively; and
      determine whether the first obstacle and the second obstacle are the same obstacle within the overlapping field of view based on the estimated first and second positions,
   wherein the first and second distance sensors are each an ultrasonic sensor or a radar sensor having an antenna configured to sense the first and second distances to the obstacle, respectively,
   wherein the auxiliary sensor is a camera sensor or an infrared sensor, and the third field of view is narrower than the first and the second field of view,
   wherein, when the detection unit determines that the first obstacle and the second obstacle are different obstacles positioned outside of the overlapping field, the detection unit ignores the first obstacle and the second obstacle for purposes of the R-AEB, and
   wherein, when the detection unit determines that the first obstacle and the second obstacle are the same obstacle positioned within the overlapping field,
      the detection unit alerts the R-AEB to brake the vehicle.

2. The obstacle detection system of claim 1, wherein the third field of view is limited to a lateral range corresponding to a width of the vehicle or a high collision range of the vehicle in a traveling direction of the vehicle.

3. The obstacle detection system of claim 1, wherein the detection unit is further configured to determine that the first obstacle and the second obstacle are the same obstacle when a difference between the estimated first and second positions of the obstacle is within a predetermined range.

4. The obstacle detection system of claim 1, wherein, when the auxiliary sensor detects the presence of the obstacle in the third field of view, the detection unit is further configured to estimate a position of the obstacle in the third field of view based on the first and second distances sensed by the first and second distance sensors, respectively.

5. The obstacle detection system of claim 1, wherein the auxiliary sensor comprises a plurality of sensors spaced apart from each other in the lateral direction of the vehicle and having fields of view partially overlapping each other.

6. The obstacle detection system of claim 1, further comprising:
   first and second transmission units spaced apart from each other in the lateral direction of the vehicle and configured to transmit ultrasonic or electromagnetic waves; and
   first and second reception units configured to receive, from the first and second transmission units, respectively, the ultrasonic or electromagnetic waves,
   wherein the first transmission unit and the first reception unit are positioned on one side of the vehicle and the second transmission unit and the second reception unit are positioned on the other side of the vehicle.

7. A method of detecting an obstacle behind a vehicle for a rear autonomous emergency braking (R-AEB) system, comprising:
   detecting, using a first distance sensor installed in a vehicle and having a first field of view of a rear region behind the vehicle, a first distance to a first obstacle positioned within the first field of view as the vehicle moves rearwardly, the first obstacle being stationary;
   detecting, using a second distance sensor installed in the vehicle and having a second field of view of the rear region behind the vehicle that overlaps the first field of view to form an overlapping field of view, a second distance to a second obstacle positioned within the second field of view, the second distance sensor spaced apart from the first sensor in a lateral direction of the vehicle as the vehicle moves rearwardly, the second obstacle being stationary;
   sensing, using an auxiliary sensor positioned between the first and second distance sensors in the lateral direction of the vehicle and having a third field of view that is within the overlapping field of view, a presence or absence of, or determining a third distance to, an obstacle at least partially positioned within the third field of view; and
   when the obstacle is detected in the third field of view by the auxiliary sensor:
      estimating, based on the first and third distances, a first position of the obstacle in the third field of view; and
      estimating, based on the second and third distances, a second position of the obstacle in the third field of view; and
   determining whether the first obstacle and the second obstacle are a same obstacle positioned within the overlapping field of view or different obstacles positioned outside the overlapping field of view based on the estimated first and second positions distances
   wherein the first and second distance sensors are each an ultrasonic sensor or a radar sensor having an antenna configured to sense the first and second distances to the obstacle, respectively,
   wherein the auxiliary sensor is a camera sensor or an infrared sensor, and the third field of view is narrower than the first and the second field of view,
   wherein, when the detection unit determines that the first obstacle and the second obstacle are different obstacles positioned outside of the overlapping field, the detection unit ignores the first obstacle and the second obstacle for purposes of the R-AEB, and
   wherein, when the detection unit determines that the first obstacle and the second obstacle are the same obstacle positioned within the overlapping field,
   the detection unit alerts the R-AEB to brake the vehicle.

8. The method of claim 7, further comprising:
   determining whether a difference between the estimated first and second positions of the obstacle in the third field of view is within a predetermined range; and
   in response to determining that the difference between the estimated first and second positions of the obstacle is within the predetermined range, determining that the obstacle in the third field of view is at least partially positioned within the overlapping field.

9. The method of claim 7, further comprising, in response to sensing the presence of the obstacle within the third field of view overlapping field, determining that the first obstacle and the second obstacle are the same obstacle positioned within the overlapping field.

* * * * *